Patented May 13, 1952

2,596,826

UNITED STATES PATENT OFFICE 2,596,826

METHOD FOR THE PREPARATION OF
1-ACETOXY-1,1-DICYANO ETHANE

Floyd D. Stewart, Akron, Ohio, assignor to The
B. F. Goodrich Company, New York, N. Y., a
corporation of New York No Drawing. Application December 5, 1950,
Serial No. 199,352

6 Claims. (Cl. 260—465.4)

This invention relates to an improved method for the preparation of 1-acetoxy-1,1-dicyano ethane, and pertains more particularly to its preparation by a vapor phase, catalytic reaction of ketene and hydrogen cyanide.

In U. S. Patent 2,476,270, to Allan E. Ardis, it is disclosed that 1-acetoxy-1,1-dicyano ethane (also known as diacetyl cyanide) is an extremely valuable compound in that it readily undergoes pyrolysis when heated to temperatures of about 450° C. to 850° C. to give monomeric vinylidene cyanide, certain polymers of which form excellent synthetic filaments, films and the like.

1-acetoxy-1,1-dicyano ethane has previously been prepared by the reaction of acetic anhydride with sodium or potassium cyanide, by the dimerization of acetyl cyanide in the presence of a base and has also been obtained, together with alpha-cyanovinyl acetate, by the liquid phase reaction of ketene and hydrogen cyanide in the presence of a tertiary amine. The vapor phase reaction of ketene and hydrogen cyanide over surface-active materials such as pumice has also been reported, but as resulting only in the production of monomolecular acetyl cyanide.

In a copending application, Serial No. 137,881, filed January 10, 1950, now Patent No. 2,574,234, it is disclosed that ketene and hydrogen cyanide react in the vapor phase in the presence of a catalyst comprising an oxide of a metal having a valence greater than 1 and occurring in periods II to IV of the periodic table, to form 1-acetoxy-1,1-dicyano ethane.

It has now been discovered that when the reaction of the copending application is carried out with the addition of a tertiary amine, greatly improved yields and conversions are secured. The reaction of ketene with hydrogen cyanide according to this invention is believed to proceed substantially according to the following equation:

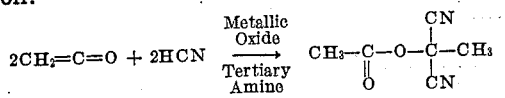

As will be seen from the above reaction equation, 2 moles of ketene are stoichiometrically required to react with 2 moles of hydrogen cyanide to form 1-acetoxy-1,1-dicyano ethane. However, the two reactants may be brought together in any desired ratio; in fact, it has been discovered that highest yields of the desired product are obtained when a slight excess of ketene, for example about 1.2 to 2 moles of ketene for each mole of hydrogen cyanide, is present.

The temperature and pressure at which the reaction is conducted may be varied considerably. In general, it may be stated that temperatures in the range of from 200° C to 500° C. are operative, with a particularly preferred range being from 300° to 350° C. The reaction is ordinarily carried out at substantially atmospheric pressures, although higher pressures and subatmospheric pressures are also operative. Dilution of the reactants with an inert gas such as nitrogen, helium or the like permits the attainment of subatmospheric partial pressures, and also facilitates mixing of the reactants and passage of the reactants over the catalyst bed.

The catalyst over which the ketene and hydrogen cyanide are passed in the preparation of 1-acetoxy-1,1-dicyano ethane is an oxide of a metal possessing a valence in excess of 1 and occurring in periods II to IV of the periodic table. The generally preferred members of this class of catalysts are the oxides of magnesium, calcium, zinc, strontium, cadmium, aluminum, titanium, vanadium, chromium, molybdenum and manganese. An especially preferred class of oxides includes the oxides of magnesium (atomic No. 12) and aluminum (atomic No. 13) which are found in the second (short) period of the periodic table; and titanium (atomic No. 22) and vanadium (atomic No. 23) which appear in the third (long) period of the periodic table. Oxides of these four metals such as magnesia, MgO, alumina, $Al_2O_3$, vanadia, $V_2O_5$, and titania $TiO_2$, are especially preferred since they are most conveniently and economically used and result in the obtainment of highest yields of substantially pure 1-acetoxy-1,1-dicyano ethane. It is also highly desirable that the activated form of these oxides be utilized since highest conversions and yields are thereby obtained. When the metal possesses more than a single valence, the oxide in which the metal has its highest valence is preferably used.

While preferred metallic oxides have been disclosed in the foregoing paragraph, it is to be understood that oxides of the other metals having a valence greater than 1 and occurring in periods II to IV of the periodic table are also operative, although the yields and conversions are appreciably higher when the preferred oxides are utilized.

Any tertiary amine may be utilized as the catalyst for the reaction of the present invention. By the term tertiary amine is meant any amine in which all of the hydrogens attached to the amino nitrogen atom have been replaced by hydrocarbon structure. Typical tertiary amines which may be utilized as catalysts include the tertiary aliphatic, aromatic and heterocyclic amines such as trimethyl amine, triethyl amine, tributyl amine, tertiary amylamine, trihexyl amine, tribenzyl amine, triphenyl amine, pyridine, picolines, N-ethyl piperidine, eucatropine, 1-methyl-3-ethyl piperidine, dimethyl-o-toluidine, N-diethyl aniline and the like. Especially preferred are those tertiary amines which are volatile at the reaction temperature, since more efficient contact of the reactants with the catalyst is thereby secured. The quantity of tertiary amine catalyst which is utilized is not critical and may be varied considerably; however, ordinarily, about 0.001 to 0.10 mole of catalyst per mole of hydrogen cyanide is utilized, although larger or smaller amounts may be utilized if so desired.

No special reaction procedures are necessary in carrying out the reaction of the present invention. Thus, the reaction is effected simply by passing vapors of ketene and hydrogen cyanide with or without a diluent gas, over the heated catalyst bed. The tertiary amine catalyst is preferably added slowly together with the reactants. However, useful expedients, which result in higher yields and conversions, but which are not critical expedients in themselves, include the use of a preheater to mix together the ketene and the hydrogen cyanide and to preheat them to a temperature of about 200° C. before they are passed over the catalyst bed, and the use of glass, ceramic or other packing material on the entrance side of the catalyst bed in order further to mix and preheat the reactants. It is also desirable that the hydrogen cyanide be substantially anhydrous, since any water present may tend to react with the ketene and reduce the yield of the desired product.

The contact time, that is, the time during which the reactant gases remain in contact with the catalyst, may be varied widely without substantially affecting the yield of 1-acetoxy-1,1-dicyano ethane. For example, contact times as low as 2 seconds to 5 or more seconds give excellent results.

The effluent gases which pass from the catalyst chamber include the desired 1-acetoxy-1,1-dicyano ethane, together with some unconverted reactants and by-products. The gases may be used in other processes, as such, or if desired, they may be condensed and the 1-acetoxy-1,1-dicyano ethane recovered from the resulting condensate by distillation, preferably at reduced pressures, or by other common means of separation.

The following examples are intended to illustrate more completely the preparation of 1-acetoxy-1,1-dicyano ethane according to the improved method of this invention, but are not to be construed as a limitation upon the scope thereof, for there are, of course, numerous possible variations and modifications. In the examples all parts are by weight.

EXAMPLE I

A catalyst tube is packed with approximately 70 parts of 3 mm. glass beads and about 40 parts of activated alumina. Triethyl amine is added slowly at the rate of 0.1852 part per hour together with ketene which is added at the rate of 0.4 mole per hour and hydrogen cyanide which is added at a rate of 0.3 mole per hour. The contact time is approximately 2 seconds. Passage of the gases through the tube is continued for 5 hours. The effluent gases pass from the catalyst chamber to a condenser and the resulting liquid condensate is collected at the end of each hour and fractionated to give substantially pure 1-acetoxy-1,1-dicyano ethane (B. P. 110° C. at 18 mm.). The conversion of hydrogen cyanide to 1-acetoxy-1,1-dicyano ethane and the yield of 1-acetoxy-1,1-dicyano ethane are determined at the end of each hour and the results together with the reaction temperature are recorded in Table I below:

Table I

| Reaction Time (Hours) | Parts 1-Acetoxy-1,1-Dicyano Ethane Collected at end of Hour Period | Per cent Conversion | Reaction Temperature, Degrees C. |
|---|---|---|---|
| 1 | 14.7 | 71.0 | 250 |
| 2 | 18.7 | 90.3 | 250 |
| 3 | 19.8 | 95.6 | 250 |
| 4 | 20.0 | 96.6 | 250 |
| 5 | 18.8 | 90.8 | 250 |

EXAMPLE II

Example I is repeated except that the ketene-HCN ratio is 0.3 mole per hour to 0.28 mole per hour and the triethyl amine charging rate is 0.1427 parts per hour. A contact time of 1.84 seconds is utilized. The pertinent data is tabulated in Table II below:

Table II

| Reaction Time (Hours) | Parts 1-Acetoxy-1,1-Dicyano Ethane Collected at end of Hour Period | Per cent Conversion | Reaction Temperature, Degrees C. |
|---|---|---|---|
| 1 | 19.9 | 96.1 | 250 |
| 2 | 18.7 | 90.3 | 250 |
| 3 | 18.9 | 91.3 | 250 |

EXAMPLE III

A series of reactions are carried out in order to determine the effect of temperature on conversion. A ketene rate of 0.6 mole per hour and a hydrogen cyanide rate of 0.5 mole per hour are maintained, the triethyl amine rate being 0.2136 part per hour. The data are shown in Table III below:

Table III

| Reaction Time (Hours) | Parts 1-Acetoxy-1,1-Dicyano Ethane Collected at end of Hour Period | Per cent Conversion | Reaction Temperature, Degrees C. |
|---|---|---|---|
| 1 | 20.5 | 60.0 | 250 |
| 2 | 26.5 | 78.8 | 250 |
| 3 | 31.8 | 92.1 | 250 |
| 4 | 28.2 | 81.7 | 250 |
| 5 | 28.9 | 83.7 | 250 |
| 6 | 30.0 | 86.9 | 250 |
| 7 | 27.2 | 78.8 | 250 |
| 8 | 27.8 | 80.5 | 250 |
| 9 | 28.9 | 83.7 | 250 |
| 10 | 27.9 | 80.8 | 250 |
| 11 | 24.1 | 69.8 | 200 |
| 12 | 22.6 | 65.5 | 200 |
| 13 | 20.0 | 57.9 | 200 |
| 14 | 28.2 | 81.7 | 300 |
| 15 | 28.4 | 82.0 | 300 |
| 16 | 28.1 | 81.4 | 300 |

When the above examples are repeated using other forms or mixtures of the metallic oxides disclosed hereinabove, for example manganese dioxide, zinc dioxide, and chromic oxide, or utilizing other tertiary amines such as those disclosed hereinabove, 1-acetoxy-1,1-dicyano ethane is again obtained. It is also obtained in good yield when the reactant gases are passed over the catalyst at different molar ratios or at other temperatures in the range of 200° C. to 500° C.

Besides being useful in preparing monomeric vinylidene cyanide the 1-acetoxy-1,1-dicyano ethane prepared according to the method of this invention is also useful for other purposes. For example, it possesses insecticidal, fungicidal and herbicidal properties as well as being a valuable intermediate in other chemical syntheses.

Although specific examples of the invention have been herein described, it is not intended to limit the invention solely thereto, but to include all of the variations and modifications falling within the spirit and scope of the appended claims.

I claim:

1. In the method which comprises passing reactants consisting of ketene and hydrogen cyanide in the vapor phase over an activated alumina, maintained at a temperature of 200° to 500° C., whereupon chemical reaction occurs between the ketene and hydrogen cyanide to form 1-acetoxy-1,1-dicyano ethane, the improvement which consists in carrying out the reaction in the presence of a tertiary amine.

2. In the method which comprises passing reactants consisting of ketene and hydrogen cyanide in the vapor phase over an activated oxide of aluminum, maintained at a temperature of 250° to 350° C., whereupon chemical reaction occurs between the ketene and hydrogen cyanide to form 1-acetoxy-1,1-dicyano ethane, the improvement which consists in carrying out the reaction in the presence of a tertiary amine.

3. The method of claim 2 wherein the tertiary amine is triethyl amine.

4. In the method which comprises passing reactants consisting of ketene and hydrogen cyanide in the vapor phase over an activated alumina maintained at a temperature of 250° C. to 350° C., whereupon chemical reaction occurs between the ketene and hydrogen cyanide to form 1-acetoxy-1,1-dicyano ethane, condensing the effluent vapors, and separating said 1-acetoxy-1,1-dicyano ethane from the resulting liquid condensate by distillation, the improvement which consists in carrying out the reaction in the presence of triethyl amine.

5. In the method which comprises passing reactants consisting of ketene and hydrogen cyanide in the vapor phase over an oxide of aluminum, whereupon chemical reaction occurs between the ketene and hydrogen cyanide to form 1-acetoxy-1,1-dicyano ethane, the improvement which consists in carrying out the reaction in the presence of a tertiary amine.

6. In the method which comprises passing reactants consisting of ketene and hydrogen cyanide in the vapor phase over an activated oxide of aluminum, whereupon chemical reaction occurs between the ketene and hydrogen cyanide to form 1-acetoxy-1,1-dicyano ethane, the improvement which consists in carrying out the reaction in the presence of a tertiary amine.

FLOYD D. STEWART.

REFERENCES CITED

The following references are of record in the file of this patent:

UNITED STATES PATENTS

| Number | Name | Date |
|---|---|---|
| 2,395,930 | Johnston et al. | Mar. 5, 1946 |
| 2,396,201 | Ray | Mar. 5, 1946 |
| 2,426,014 | Gresham | Aug. 19, 1947 |